Nov. 22, 1949     A. T. C. DEAR     2,488,965
REFUSE COLLECTING VEHICLE
Filed Feb. 20, 1948     3 Sheets-Sheet 1
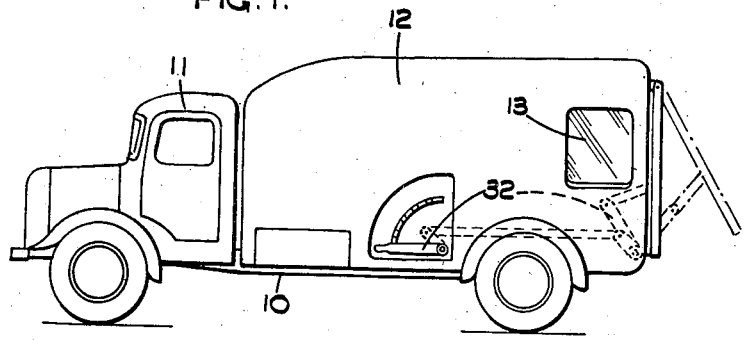
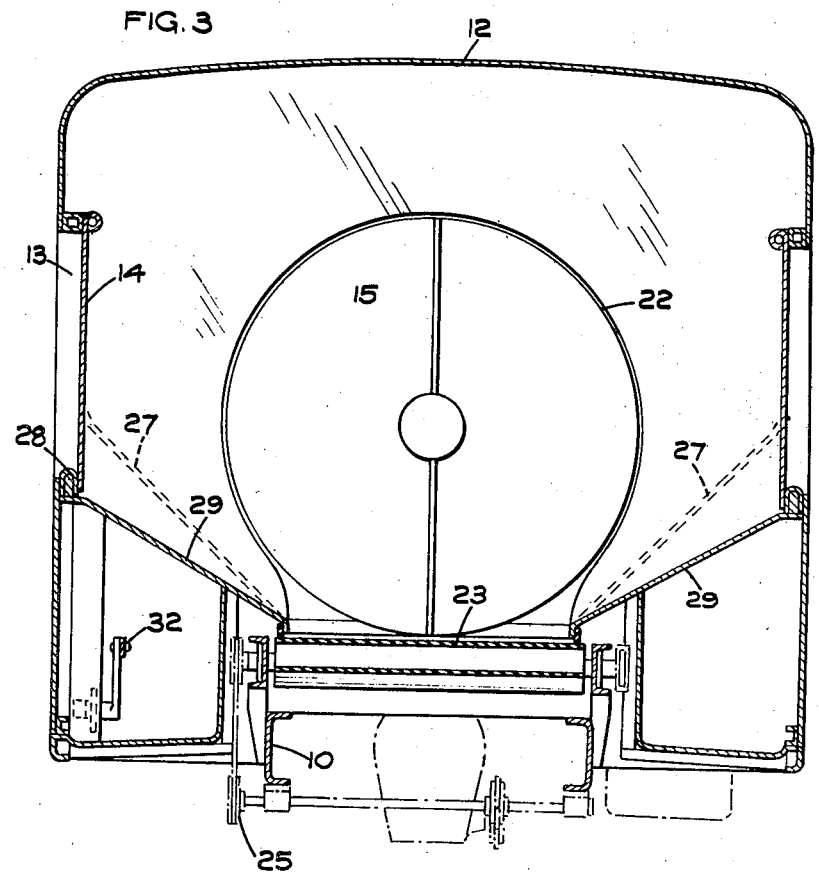
INVENTOR:
Alexander Thomas Cameron Dear.
BY *Tucker & Tucker*
AGENTS.

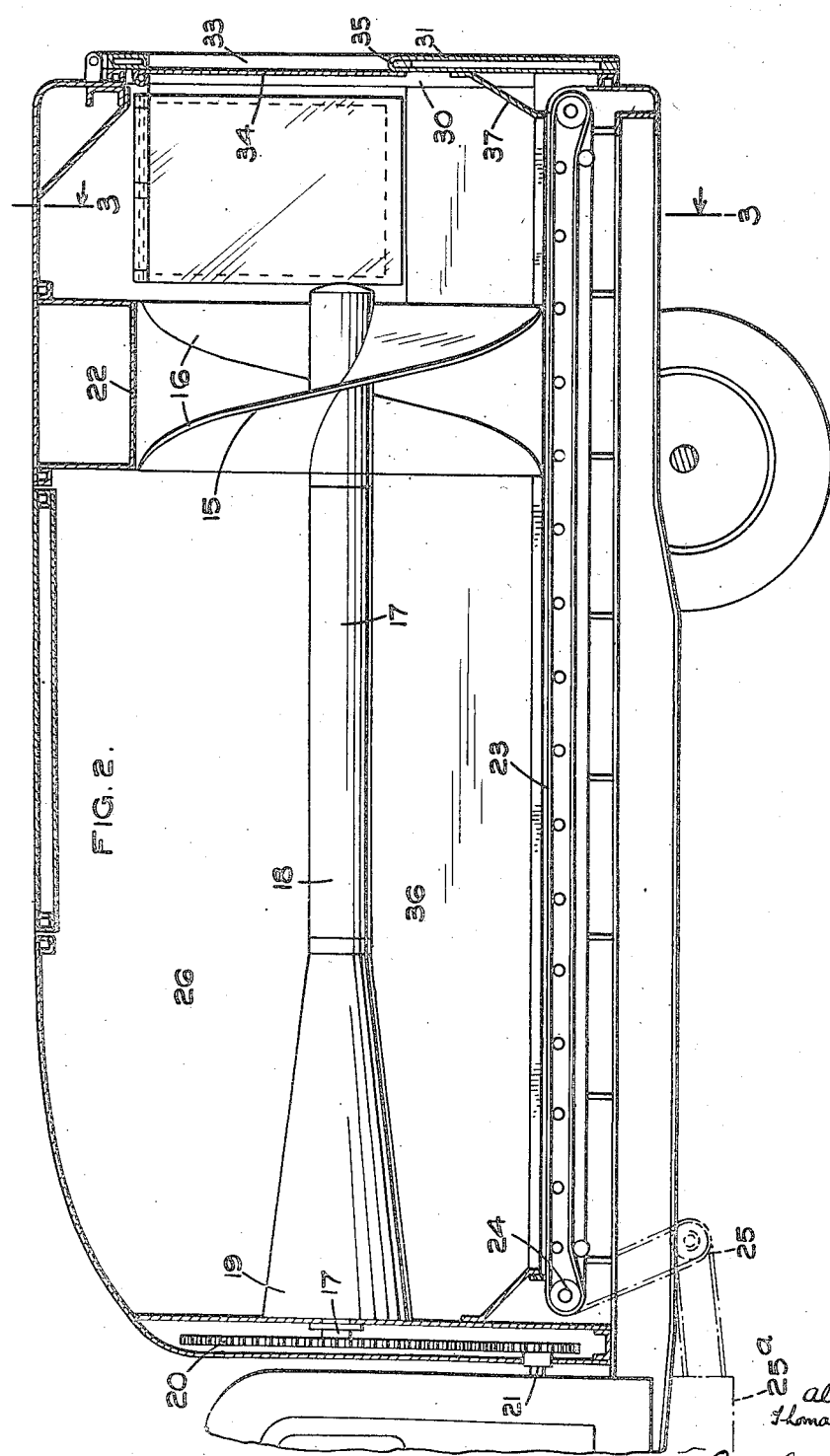

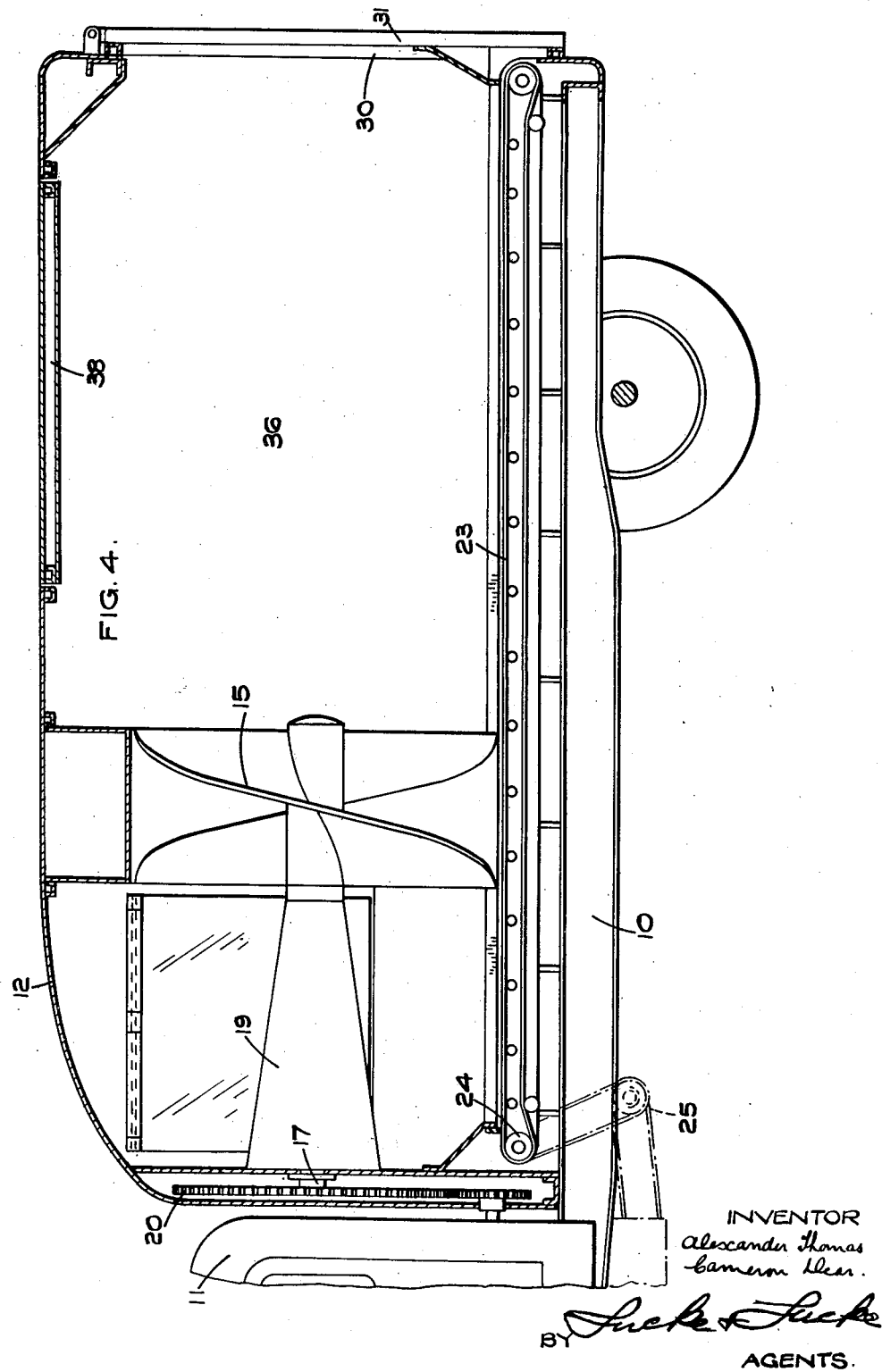

Patented Nov. 22, 1949

2,488,965

UNITED STATES PATENT OFFICE 2,488,965

REFUSE COLLECTING VEHICLE

Alexander Thomas Cameron Dear, West Bromwich, England, assignor to Lewin Road Sweepers Limited, West Bromwich, England, a British company Application February 20, 1948, Serial No. 9,771
In Great Britain January 8, 1948

Section 1, Public Law 690, August 8, 1946

8 Claims. (Cl. 214—67)

1

This invention relates to refuse-collecting vehicles. Refuse-collecting vehicles are already known which comprise a refuse container having a charging opening through which the refuse is tipped or otherwise delivered into the interior of the container, and a rotatable impeller having helical blades for feeding the delivered refuse into the interior of the container so as to pack it therein, and thus utilise economically the storage capacity of the container.

In such hitherto known vehicles the charging opening has been disposed at the rear of the vehicle, with the impeller disposed within the container a short distance inwardly from the opening, and the same opening has been used for discharging the refuse from the container; and to enable the refuse to be discharged, i. e. displaced rearwardly in relation to the container, the latter has been mounted for bodily rotation about a central axis extending longitudinally of the vehicle and provided with a spiral or helical blade so that on rotating the container in the proper direction, having regard to the hand of the spiral, the refuse is ejected through the charging opening.

Such an arrangement is subject to the disadvantage that the mounting of the container for bodily rotation is an expensive arrangement involving accurate manufacture of the container and the provision of special supporting bearings therefor.

The object of this invention is to provide an improved construction in which this particular disadvantage is avoided.

Referring to the drawings:

Figure 1 is a side elevation of one form of refuse-collecting vehicle constructed in accordance with the present invention.

Figure 2 is a longitudinal sectional view of the rear part of the vehicle depicted in Figure 1.

Figure 3 is a sectional view on the line 3—3 of Figure 2, and

Figure 4 is a view similar to Figure 2 showing a modified construction.

Referring firstly to Figures 1 to 3 of the drawings, the refuse-collecting vehicle where illustrated comprises a chassis 10 provided with the usual driver's compartment 11, in front of which is disposed a power unit, not shown in the drawings, the vehicle being provided to the rear of the driver's compartment with a refuse container 12 formed as a sheet metal body each of the longitudinal sides of which at the rear end of the container are provided with a loading opening 13

2 closed by a flap 14 hinged to the body side about its upper edge.

Immediately in front of each of the loading openings 13 the container 12 is provided internally with an impeller 15 having two sets of helical blades 16 which form in effect a double-start screw, the impeller being carried upon the rear end of a shaft 17 extending longitudinally of the vehicle, the shaft being enclosed within an outer rotatable sleeve 18, in the manner described in our application Serial No. 673,698, filed May 31, 1946, Patent No. 2,469,033, granted May 3, 1949, and being provided near its front with a supporting bearing carried upon housing 19 in the manner described in the said application.

The impeller shaft 17 is driven through gearing 20 from a shaft 21 adapted to be connected by a clutch, not shown, and operable by the driver from a suitable power take-off provided on the power unit. The drive to the shaft 21 incorporates a reverse gear, not shown, for the purpose of enabling the impeller to be rotated in either direction.

The impeller has a diameter substantially less than the internal dimensions of the container 12 and is disposed so that its lower edge is adjacent to the floor of the container, the impeller with the exception of such edge being surrounded by an enclosing shroud 22 of part-cylindrical form and secured to the walls of the container.

Extending longitudinally of the container for the full length thereof and adjacent the container floor is a conveyor 23 of the endless-belt type and driven by a driving roller 24 connected through transmission gearing 25 to a further clutch, not shown, and operable by the driver and driven from the power take-off aforesaid. A reverse gearbox, indicated at 25a, is provided for the purpose of enabling the drive to the conveyor, and hence its direction of movement, to be reversed. The arrangement is such that the conveyor as well as the impeller can be operated independently of one another and when desired by the operator.

The width of the conveyor 23 is substantially less than the maximum width of the container 12, and the lower part of the side walls 26 thereof forwardly of the impeller slope inwardly in a downward direction, as indicated at 27 in Figure 3, the lower edges of the sloping portion being disposed adjacent the longitudinal edges of the upper run of the conveyor belt.

Beneath the sill 28 of each of the loading openings 13 the container side further slopes inwardly in a downward direction towards the longitudinal edges of the rear part of the conveyor, as indicated at 29, though the angle of slope is less than in the case of the part 27.

The rear end of the container 12 is provided with a refuse-discharge opening 30, which is normally closed by a door 31 hinged to the container body about its upper edge and operable through operating mechanism, indicated at 32 in Figure 1. To enable the refuse to be loaded if desired through the rear end of the container, instead of through one of the side walls thereof, the door 31 is provided with an end loading opening 33 provided with a hinged closure flap 34 hinged about its upper edge and adapted at its lower edge to engage with the sill 35 of the opening 33.

With the arrangement described, when it is desired to charge the container with the refuse the impeller is driven in the requisite direction for feeding material forwardly of the container, that is to say in an anticlockwise direction when viewed from the rear, and the conveyor is set in motion so that the upper one of the conveyor belts moves in a forward direction relative to the vehicle. The refuse is then charged through one of the side loading openings 13, or through the end loading opening 33, as may be desired, so that it falls on the rear end of the conveyor 23 and is fed by the latter to the impeller 15, which by its loading serves in the known manner to pack the material into the interior of the container to the front of the impeller, which interior constitutes a refuse-containing compartment 36. The impeller serves to pack the material into this compartment so as to utilise the capacity of the compartment to the maximum extent, but the packing of the compartment is facilitated by the forward movement of the upper run of the conveyor belt.

The delivery of the charged material to the conveyor from the side loading openings 13 is facilitated by the sloping parts 29, and from the end loading opening 33 is facilitated by a deflector member 37 disposed below the sill 35 and attached to the door 31 so as to be movable therewith.

When it is desired to discharge the contents of the compartment 36, the impeller and conveyor are both driven in the reverse direction to that above described, and the door 31 is opened, the refuse being discharged rearwardly therethrough consequent on the reverse movement of the conveyor and impeller.

It should be noted that the width of the conveyor 23 is somewhat less than the diameter of the impeller in order to ensure that the material fed by the conveyor to the impeller during both the charging and discharging operations is adequately engaged by the impeller blades and propelled thereby in a forward or rear direction, respectively.

Referring now to the modified construction illustrated in Figure 4, the container is here provided with two loading openings only which are disposed one in each of the side walls of the container adjacent the front end thereof, the arrangement being similar to that described in our application No. 9,775, filed February 20, 1948. In this construction the impeller is disposed immediately to the rear of the two side loading openings and the space to the rear of the impeller constitutes the refuse-containing compartment, while the discharge opening 30, again provided at the rear of the container, has a door 31 of construction similar to that described in our application No. 9,772, filed February 20, 1948, i. e. the door does not include a loading opening.

Apart from these modifications, the construction is similar to the one just described, although provision is made for driving both the impeller and the conveyor in one direction only, that is to say for feeding the refuse in a rearward direction, i. e. the impeller rotates in an anticlockwise direction when viewed from the rear and the upper run of the conveyor belt moves rearwardly.

In operation the refuse is charged through the one or the other of the two loading openings 13 when it is deflected onto the forward end of the conveyor by deflector members similar to the side portions 29 of the preceding construction, the refuse being then fed by the conveyor to the impeller, which packs it rearwardly in the known manner into the compartment 36, packing thereof being facilitated by the conveyor 23 extending into the rear part of this compartment.

Discharge of the refuse from the compartment is effected by opening the door 31 and operating the conveyor 23, the impeller being stationary during the discharging operation.

With both of the constructions described the roof of the compartment 36 may be provided with an auxiliary loading opening closed by a pair of hinged trap doors 38, in the manner described in our application No. 9,772, filed February 20, 1948, through which the compartment can be hopper-loaded with grit, sand and the like for road-sprinkling purposes; and if desired with the construction shown in Figure 4 the direction of movement of the conveyor may be made reversible so as to feed such material forwardly of the compartment 36, the discharge of such material being effected in the same manner as the refuse already described.

In the case of the construction shown in Figure 4 this auxiliary opening may serve for the loading of the compartment with bulky articles of refuse which cannot be fed past the impeller.

A refuse-collecting vehicle in accordance with the present invention possesses the advantage that the expensive rotatable mounting of the container is dispensed with and a cheaper and simpler construction results, while at the same time means are provided both for mechanically packing the refuse into the container and also for mechanically discharging the refuse therefrom.

I claim:

1. In a refuse collecting vehicle a refuse container mounted non-rotatably on the vehicle and including a refuse receiving compartment, refuse receiving means and refuse discharge means associated with said container, a rotatable bladed impeller disposed intermediate said refuse receiving means and said compartment and adapted to pack refuse from said receiving means into said compartment, means for transmitting drive to said impeller, a single conveyor adjacent the bottom of said container extending from said refuse receiving means to said impeller and from said compartment to said refuse discharge means and adapted both to convey refuse from said refuse receiving means to said impeller and from said compartment towards said discharge means, and means for transmitting drive to said conveyor.

2. In a refuse collecting vehicle a refuse container mounted non-rotatably on the vehicle and including a refuse receiving compartment, refuse receiving means and refuse discharge means disposed at the rear end of said container, a rotatable bladed impeller disposed intermediate said refuse receiving compartment and said refuse receiving and discharge means, said impeller being adapted on rotation in one direction to pack said refuse forwardly of said container into said compartment and on rotation in the other direction to impel refuse rearwardly from said compartment to said refuse discharge means, means for transmitting drive to said impeller, a conveyor extending from said compartment to said refuse discharge means and adapted to convey refuse in a direction from said compartment towards said discharge means and means for transmitting drive to said conveyor.

3. In a refuse collecting vehicle a refuse container mounted non-rotatably on the vehicle and including a refuse receiving compartment, refuse receiving means and refuse discharge means disposed at the rear end of said container, a rotatable bladed impeller disposed intermediate said refuse receiving compartment and said refuse receiving and discharge means, said impeller being adapted on rotation in one direction to pack said refuse forwardly of said container into said compartment and on rotation in the other direction to impel refuse rearwardly from said compartment to said refuse discharge means, means for transmitting drive to said impeller, a conveyor extending longitudinally of the compartment from the impeller to the front end of said compartment, said conveyor being adapted for movement in either direction longitudinally of the vehicle and means for transmitting drive to said conveyor.

4. In a refuse collecting vehicle a refuse container mounted non-rotatably on the vehicle and including a refuse receiving compartment, said container having at its rear end a refuse loading opening and a refuse discharge opening, a rotatable bladed impeller disposed intermediate said refuse compartment and said openings, said impeller being adapted on rotation in one direction to pack said refuse forwardly of said container into said compartment and on rotation in the other direction to impel refuse rearwardly from said compartment to said refuse discharge opening, means for transmitting drive to said impeller, a conveyor extending longitudinally of the compartment from the impeller to the front end of said compartment, said conveyor being adapted for movement in either direction longitudinally of the vehicle and means for transmitting drive to said conveyor.

5. In a refuse collecting vehicle a refuse container mounted non-rotatably on the vehicle and including a refuse receiving compartment, said container having a refuse discharge opening at its rear end, a door for said refuse discharge opening, said door having a loading opening therein, closure means adapted normally to close said loading opening, a rotatable bladed impeller disposed intermediate said refuse compartment and said openings, said impeller being adapted on rotation in one direction to pack said refuse forwardly of said container into said compartment and on rotation in the other direction to impel refuse rearwardly from said compartment to said refuse discharge opening, means for transmitting drive to said impeller, a conveyor extending longitudinally of the compartment from the impeller to the front end of said compartment, said conveyor being adapted for movement in either direction longitudinally of the vehicle and means for transmitting drive to said conveyor.

6. In a refuse collecting vehicle a refuse container mounted non-rotatably on the vehicle and including a refuse receiving compartment, said container having at the rear end a refuse loading opening and a refuse discharge opening, a rotatable bladed impeller disposed intermediate said refuse compartment and said openings, said impeller having helical blades and being mounted on rotation about an axis extending longitudinally of the vehicle, said impeller being adapted on rotation in one direction to pack said refuse forwardly of said container into said compartment and on rotation in the other direction to impel refuse rearwardly from said compartment to said refuse discharge opening, means for transmitting drive to said impeller, a conveyor extending longitudinally of the compartment from the impeller to the front end of said compartment, said conveyor being adapted for movement in either direction longitudinally of the vehicle and means for transmitting drive to said conveyor.

7. In a refuse collecting vehicle a refuse container mounted non-rotatably on the vehicle and including a refuse receiving compartment, said container having a refuse loading opening at the front end thereof and a refuse discharge opening at the rear end thereof, a rotatable bladed impeller within said container disposed intermediate said refuse loading opening and said refuse receiving compartment and adapted to pack refuse from said loading opening rearwardly to said compartment, means for transmitting drive to said impeller, a single conveyor extending longitudinally of said container adjacent the bottom thereof from the front end thereof adjacent said refuse receiving means to the rear end thereof adjacent said refuse discharge means and means for transmitting drive to said conveyor to feed refuse from the refuse loading opening to the impeller and from the refuse receiving compartment to the refuse discharge opening.

8. In a refuse collecting vehicle a refuse container mounted non-rotatably on the vehicle and including a refuse receiving compartment, said container having a refuse loading opening at the front end thereof and a refuse discharge opening at the rear end thereof, said loading opening being disposed in one of the side walls of said container, a rotatable bladed impeller within said container disposed intermediate said refuse loading opening and said refuse receiving compartment and adapted to pack refuse from said loading opening rearwardly to said compartment, said impeller having helical blades and being mounted on rotation about an axis extending longitudinally of the vehicle, means for transmitting drive to said impeller, a conveyor extending longitudinally of said container from the front end to the rear end thereof and means for transmitting drive to said conveyor.

ALEXANDER THOMAS CAMERON DEAR.

REFERENCES CITED

The following references are of record in the file of this patent:

FOREIGN PATENTS

| Number | Country | Date |
|---|---|---|
| 550,152 | Germany | May 6, 1932 |
| 749,693 | France | May 8, 1933 |
| 813,441 | France | Feb. 22, 1937 |